United States Patent [19]

Wright et al.

[11] Patent Number: 5,273,129
[45] Date of Patent: Dec. 28, 1993

[54] VEHICLE STEERING SYSTEMS

[75] Inventors: Peter G. Wright, Norfolk; David A. Williams, Milton Keynes, both of United Kingdom

[73] Assignee: Group Lotus PLC, Norwich, United Kingdom

[21] Appl. No.: 773,892

[22] PCT Filed: Apr. 26, 1990

[86] PCT No.: PCT/GB90/00642
§ 371 Date: Dec. 13, 1991
§ 102(e) Date: Dec. 13, 1991

[87] PCT Pub. No.: WO90/12723
PCT Pub. Date: Nov. 1, 1990

[30] Foreign Application Priority Data

Apr. 26, 1989 [GB] United Kingdom ............... 8909471
May 4, 1989 [GB] United Kingdom ............... 8910278

[51] Int. Cl.⁵ ............................................. B62D 5/06
[52] U.S. Cl. ................................... 180/132; 180/133
[58] Field of Search ............... 180/132, 133, 141, 142; 280/773

[56] References Cited

U.S. PATENT DOCUMENTS

| | | | |
|---|---|---|---|
| 2,931,239 | 4/1960 | Dietrich | 74/388 |
| 3,011,579 | 12/1961 | Milliken, Jr. et al. | 180/79.2 |
| 4,043,124 | 8/1977 | Weisgerber | 180/133 |
| 4,131,177 | 12/1978 | Goodbary et al. | 180/133 |
| 4,293,051 | 10/1981 | Nishikawa | 180/133 |
| 4,396,083 | 9/1983 | Wehberg | 180/133 |
| 4,589,293 | 5/1986 | Mori | 180/133 |
| 4,718,514 | 1/1988 | Hirakushi | 180/133 |
| 4,736,811 | 4/1988 | Marsden et al. | 180/133 |
| 4,798,253 | 1/1989 | Naito | 180/133 |
| 4,819,757 | 4/1989 | Elser et al. | 180/133 |
| 4,940,105 | 7/1990 | Matsunaga et al. | 180/133 |

FOREIGN PATENT DOCUMENTS

3636080A1  4/1988  Fed. Rep. of Germany.
3809192     9/1988  Fed. Rep. of Germany.
PCT/EP87/-
00380        7/1987  PCT Int'l Appl..
2204540A  11/1988  United Kingdom.

Primary Examiner—Margaret A. Focarino
Assistant Examiner—Florian Zeender
Attorney, Agent, or Firm—Westman, Champlin & Kelly

[57] ABSTRACT

The invention relates to a vehicle steering system comprising a steering wheel (11), control signal generating means (12) responsive to the operation of the steering wheel (11), means for steering at least one vehicle wheel in response to control signals generated by the generating means and also selectively operable coupling means (41) to enable the steering means to be mechanically coupled to the steering wheel for manual steering of the vehicle wheel independently of the control signals.

17 Claims, 8 Drawing Sheets

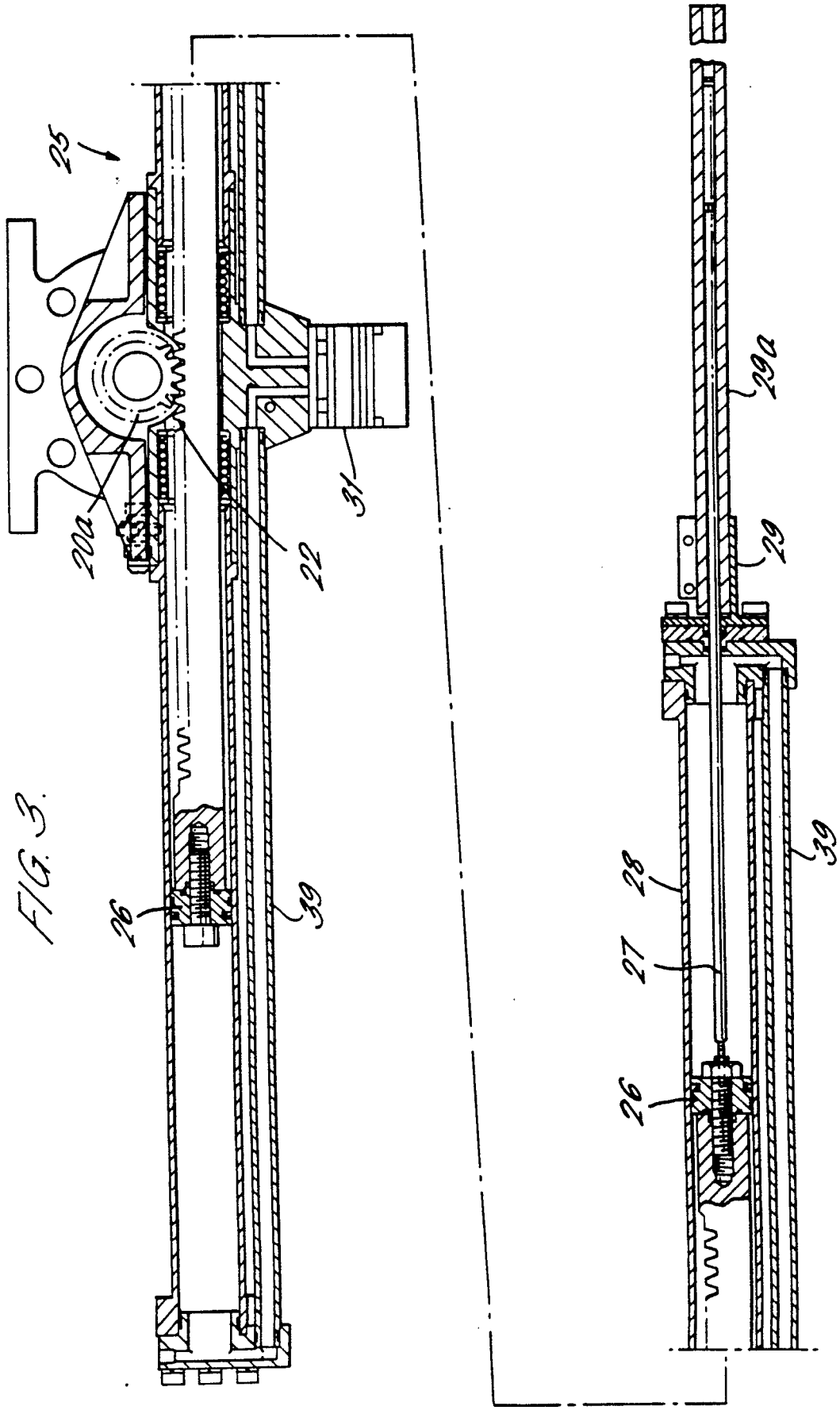

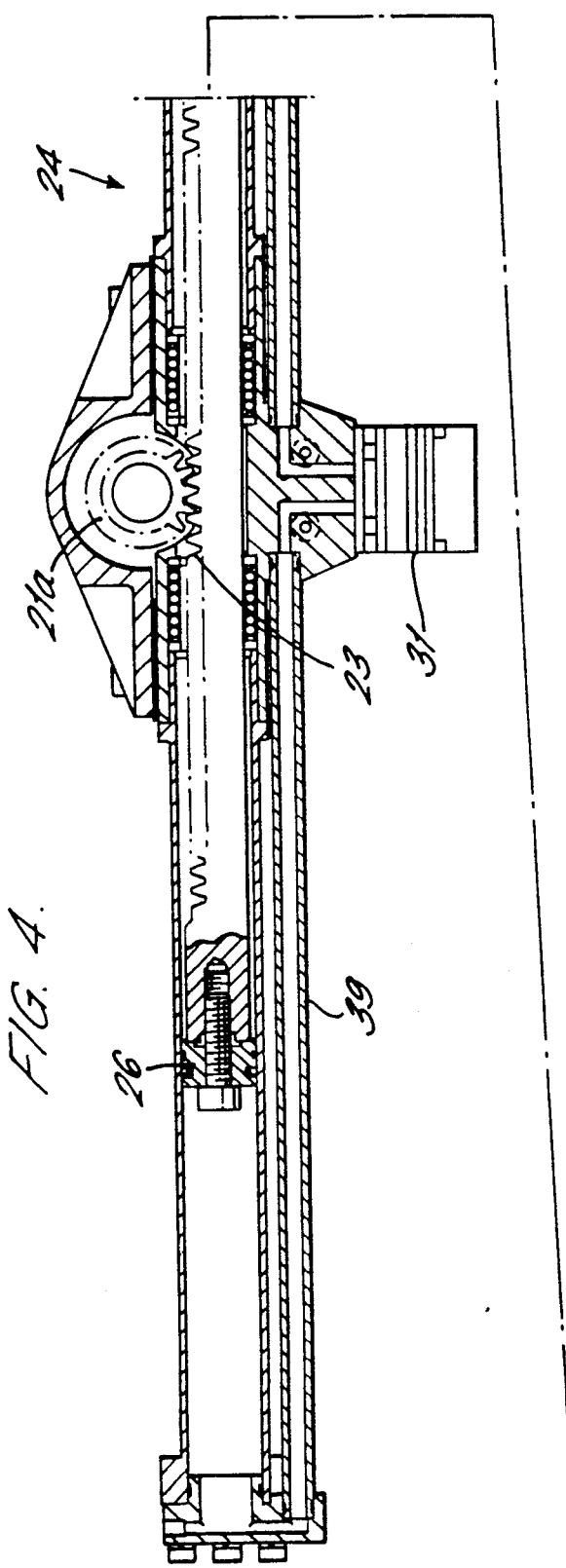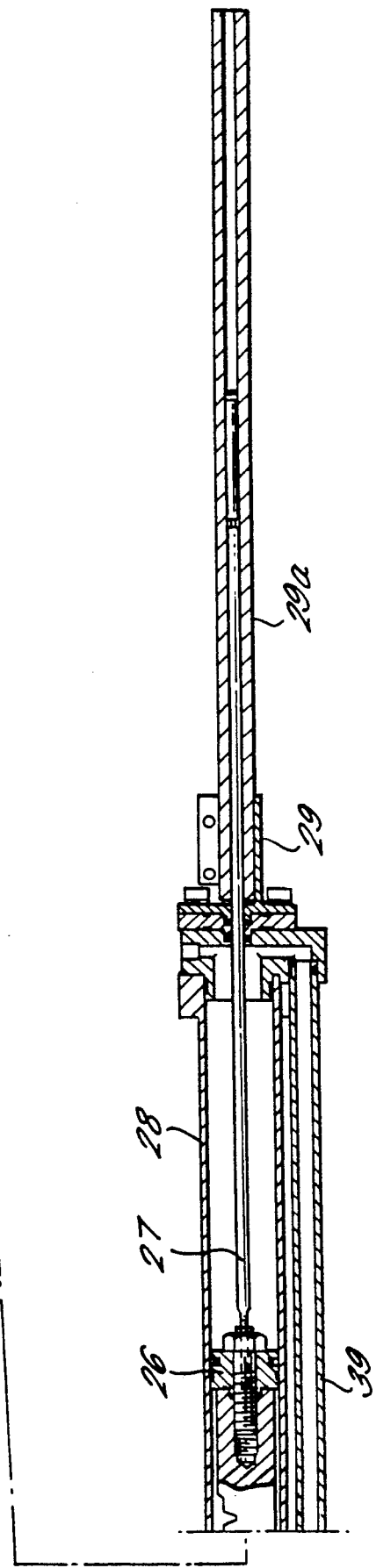
FIG. 4.

VEHICLE STEERING SYSTEMS

BACKGROUND OF THE INVENTION

The invention relates to vehicle steering systems.

Most modern motor vehicles are provided with entirely mechanical or semi-mechanical steering systems. Mechanical systems generally include a steering wheel fixed to a steering column, the rotation of which controls the movement of wheels of the vehicle via a steering linkage including a steering box which converts the rotary movement of the steering wheel to longitudinal movement of track rods which control the movement of the wheels. Since it would necessitate much effort by the driver to move the wheels if the steering wheel was directly connected to the steering linkage, a reduction gear system is generally incorporated in the steering box to assist the driver.

There are disadvantages and problems with known mechanical systems. For example, much effort by the driver is required to turn the wheels in certain conditions, even when a reduction gear system is included, particularly where the vehicle is stationary. The driver is also subject to shocks being transmitted via the steering column to the driver's hands when the wheels hit a pot hole or obstruction in the road, thus making driving difficult and possibly dangerous.

On heavy cars and larger vehicles power assisted steering is used, a hydraulic, electrical or air system being included to assist movement of the wheels when the effort required at the steering wheel would otherwise be excessive.

Power assisted steering systems help to remove some of the disadvantages mentioned above, but such systems tend to be very expensive and bulky and the combination is often heavy, requiring specifically designed parts. The driver is also at some risk if there is a failure in the system.

In aircraft systems have been developed for manipulating moveable parts such as ailerons and rudders on which the input from the pilot is decoupled from the moving part, and forces acting on the part are absorbed by the system. Because of the growing size of aircraft and the need for lightweight components, the mechanical systems previously used became unwieldy and unsuitable and were entirely replaced by hydraulic systems which were lighter and more versatile.

Because of the advantages provided by entirely hydraulic systems over mechanical systems such as their reliability, efficiency, light weight, and their usefulness in offering a more flexible and versatile means of power transmission, it has been sought to use such systems wherever possible. However, because of the possibility of failure resulting from a drop in pressure in the system due for example to leakage or contamination of the hydraulic fluid, the sole use of such systems has been avoided in mobile situations where total control of the moving parts is vital to safety, e.g. the steering of a motor vehicle.

In EP-A-0225773 there is described a vehicle steering system for hydraulically steered rear wheels, which in the event of failure operates to steer the rear wheels straight ahead. However, the vehicle also comprises conventionally steerable front wheels under direct control by the driver.

Furthermore, it has been noted that different drivers have different preferences with regard to the characteristics of steering systems, and hitherto it has not been possible to adapt the characteristics of a system to suit the driver. When a driver feels comfortable his driving will probably tend to be safer.

SUMMARY OF THE INVENTION

According to this invention there is provided a vehicle steering system comprising a manually operable steering element; control signal generating means responsive to operation of the steering element; means for steering at least one vehicle wheel in response to control signals generated by the generating means; and selectively operable coupling means to enable the steering means to be mechanically coupled to the steering element for manual steering of said vehicle wheel independently of said control signals.

Operation of the steering element can be either movement thereof or application of force thereto.

The coupling means may be selectively operable by means of a manually operable switch.

Preferably the coupling means are operable automatically on detection of a system failure to uncouple the steering means from the steering element.

The coupling means preferably comprises spring means biasing the coupling means to mechanically couple the steering means to the steering element.

In a preferred embodiment the coupling means is operable by fluid pressure, the application of fluid pressure to the coupling means biasing the coupling means to mechanically uncouple the steering means from the steering element.

The coupling means preferably comprises a piston moveable in a cylinder between a first position in which the steering means is mechanically coupled to the steering element, and a second position, in which said steering means and steering element are uncoupled.

Preferably the steering element is mounted on a first steering column part and the steering means coupled to a second steering column part, in which case the coupling means can include keying means comprising a plurality of balls moveable by the piston into and out of locking engagement with the steering column parts so that the steering column parts may be coupled or uncoupled.

The steering element is preferably a steering wheel.

BRIEF DESCRIPTION OF THE DRAWINGS

A vehicle steering system according to the invention will now be described by way of example with reference to the drawings, in which:

FIG. 3 is a sectional view on III—III in FIG. 2;

FIG. 4 is a sectional view on IV—IV in FIG. 2;

DETAILED DESCRIPTION OF THE PREFERRED EMBODIMENTS

The Steering System

Figure 1:
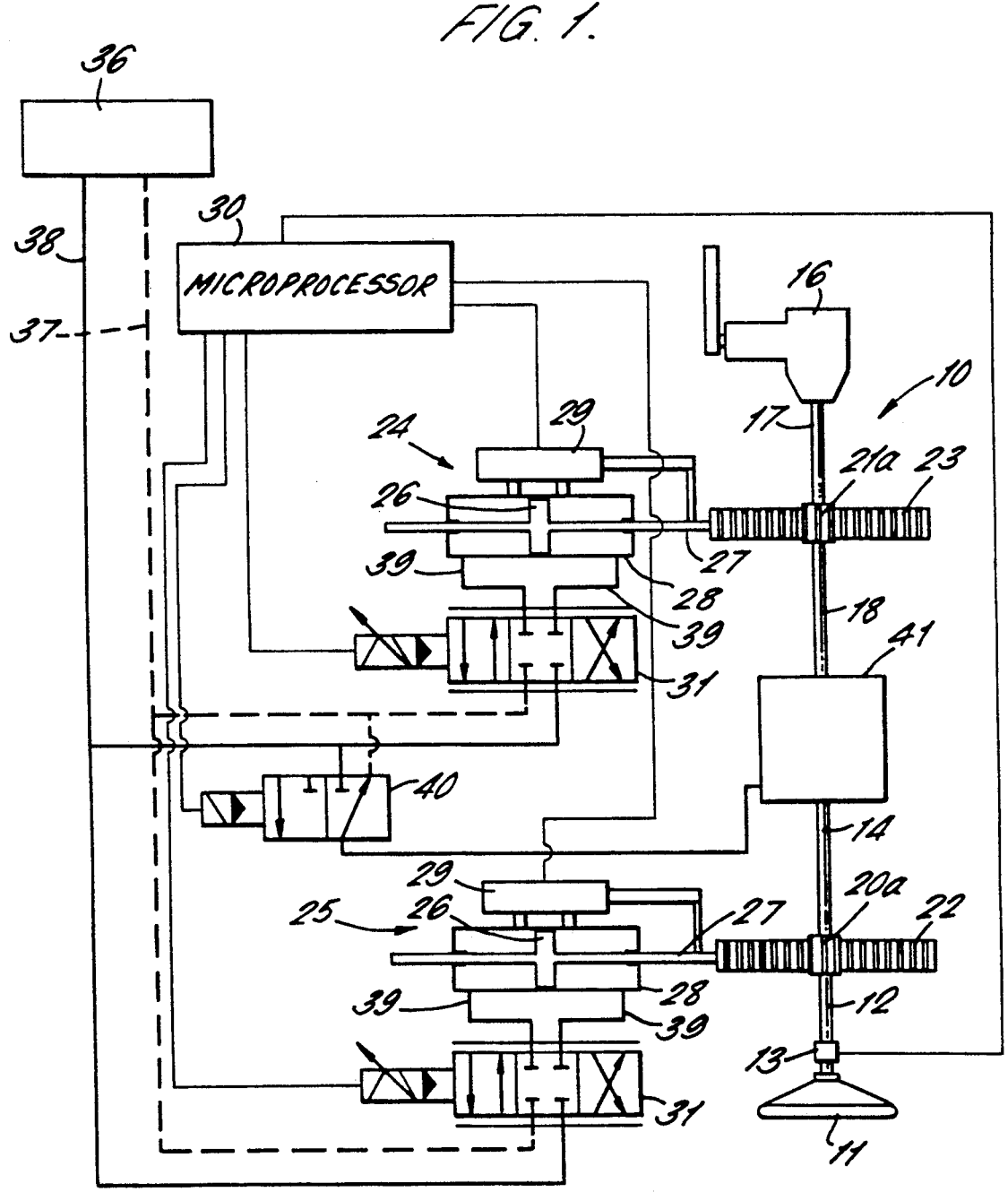
FIG. 1 is a schematic diagram of one embodiment of the system.

Referring first to FIG. 1, there is shown a schematic diagram of a vehicle steering system 10 for use in a motor vehicle (not shown) such as a car, having steerable wheels. The steering system 10 comprises a steering wheel 11 fixed to one end of a steering column 12 journalled in a mounting structure secured to the vehicle. The steering column 12 comprises a first part comprising an input shaft 14 and a second part comprising an output shaft 18, co-axially aligned end to end. Mounted on the input shaft 12 is a steering torque sensor 13. The sensor 13 is preferably a duplex torque transducer which is capable of measuring the torque applied to the steering column 12 in both an anti-clockwise and clockwise direction. The sensor 13 output is supplied to a control unit 30, such as a microprocessor. The duplex sensor 13 operates by generating two signals which are compared by the microprocessor and if the error level detected is greater than a preset signal it will cause a reaction in the system as discussed later.

Connected in a known manner to the end of the output shaft 18 remote from the input shaft 14 is a steering box 16 which in turn is connected to a steering linkage (not shown) to control movement of the vehicle wheels (also not shown) in a known manner. The steering box 16 is preferably of the manual type, although with suitable adaptations to the system power-assisted hydraulic steering gear could be used. The steering box 16 may be replaced by a rack steering linkage.

Mounted on and coupleable to the input shaft 14 is a gear input sleeve 20a and to the output shaft 18 a gear output sleeve 21a. A portion of each of the sleeves 20a, 21a has teeth around its entire diameter in the manner of a pinion. The teeth of the input and output sleeves 20a, 21a engage respectively with an input and an output rack 22, 23 and thus rotation of the sleeves 20a, 21a will cause the racks 22, 23 to move to the left or right.

The steering system 10 also comprises a control system which has a hydraulic "steer" actuator 24 and "feel" actuator 25 which will now be described mainly with reference to FIG. 1.

The feel actuator 25 is operable at the steering wheel end of the steering system 10 and the steer actuator 24 at the steering box end of the system 10.

FIG. 1 shows a schematic diagram of how the feel actuator 25 interacts with other parts of the system 10, whereas FIG. 3 shows its actual configuration.

The feel actuator 25 comprises the input rack 22 which is contained within a hydraulic cylinder 28. At each end of the input rack 22 is a piston head 26.

Connected to one piston head 26 is a rod 27 which has a slug attached at one end and which enters, at one end of the cylinder 28, the holder 29a of a linear variable inductive transformer (LVIT) 29. The LVIT 29 converts the mechanical displacement of the input rack 22 into an electrical signal which is transmitted to the microprocessor 30 to which the LVIT 29 is electrically connected. Other suitable devices may of course be used for converting the displacement into an electrical signal.

A servo-valve 31 is hydraulically connected via transfer tube 39 to both ends of the cylinder 28 and therefore may be used to control the movement of the input rack 22 by hydraulic pressure on the piston heads 26.

Figure 6:
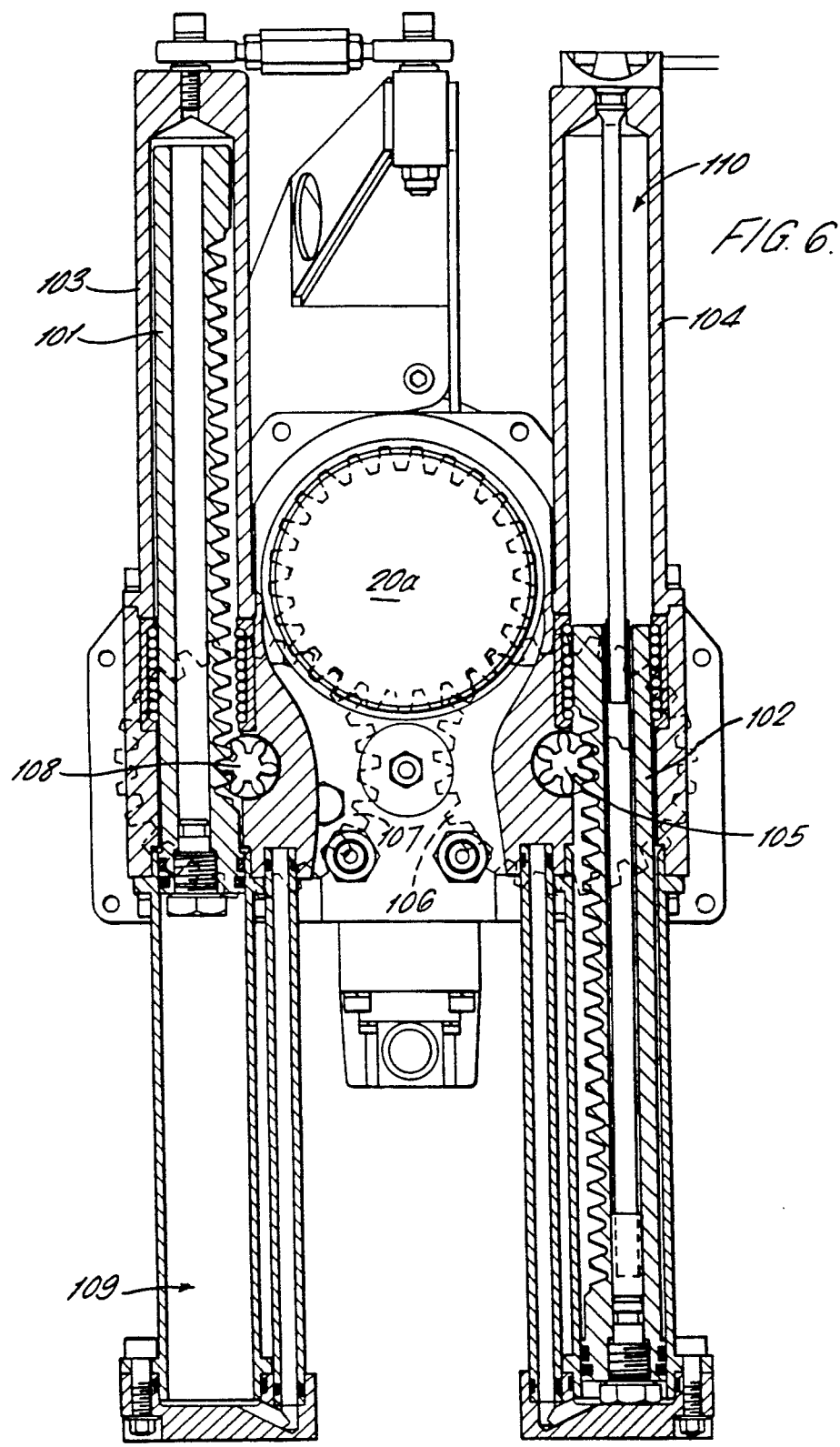
FIG. 6 is a cross-sectional view of a preferred embodiment of a variable feed actuator according to the invention.

A preferred embodiment of a variable fuel actuator according to the invention can be seen in FIG. 6. Two toothed racks 101 and 102 are respectively arranged to slide within two cylinders 103 and 104. The toothed racks 101 and 102 are connected by a series of gears 105, 106, 107 and 108 to the input sleeve 20a of the steering column. The servo-valve 31 is hydraulically connected to an inlet at the end 109 of cylinder 103 and also to an inlet at the end 110 of the cylinder 104. In this way, the hydraulic fuel actuator can apply either clockwise or counterclockwise torques to the steering column, by selectively introducing hydraulic fluid into either cylinder 103 or cylinder 104. This embodiment of the invention has the advantage of being compact. The embodiment also reduces gear backlash, since positive forces are maintained on the gears throughout the operation of the actuator.

The steer actuator 24 of FIG. 1 comprises a similar arrangement to the feel actuator 25 and is shown in FIG. 4, with the output rack 23 in engagement with the output gear sleeve 21a. The steer actuator of the system could also comprise an existing power steering actuator of a vehicle, modified to be controlled by the system described herein.

The servo-valves 31 are hydraulically connected to a hydraulic pressure source 36 via hydraulic fluid pressure and return lines 38, 37 (see FIG. 1).

An isolating valve 40 is also hydraulically connected to the pressure and return lines 38, 37 and to a mechanical interlock device 41 and electrically to the microprocessor 30. The isolating valve 40 is preferably a solenoid valve which can be energized by a signal from the microprocessor 30 to open to apply hydraulic pressure to the mechanical interlock device 41.

When the valve 40 is closed the interlock device 41 is connected to the fluid return line 37.

The Mechanical Interlock

One embodiment of the interlock device 41 will now be described in detail with reference to FIG. 2.

The mechanical interlock device 41 comprises an input section 42, an output section 43 and an actuation section 44.

The input section 42 comprises an input housing 45 having an end cap 46 affixed thereto by suitable means 47. The end cap 46 has an axial hole 48 therein through which input shaft 14 is positioned and sealed with a sealing ring 49. The input shaft 14 is rotatably supported within the input housing 45 by a series of bearings which comprise an angular contact bearing 50, and a thrust needle roller bearing 51 separated from a needle roller bearing 52 by a thrust cap 53. Obviously, other combinations may be used where suitable.

Mounted within the housing 45 on input shaft 14 is the input gear sleeve 20a previously referred to in respect of FIG. 1. The needle roller bearing 52 is positioned between the input shaft 14 and the input sleeve 20a to assist relative rotational movement therebetween when required.

The input housing 45 is attached by suitable means to the central housing 55 of the actuation section 44. Where the two housings 45, 55 join the input sleeve 20a is supported within the end of the input housing 45 by a ball bearing 54.

Figure 5:
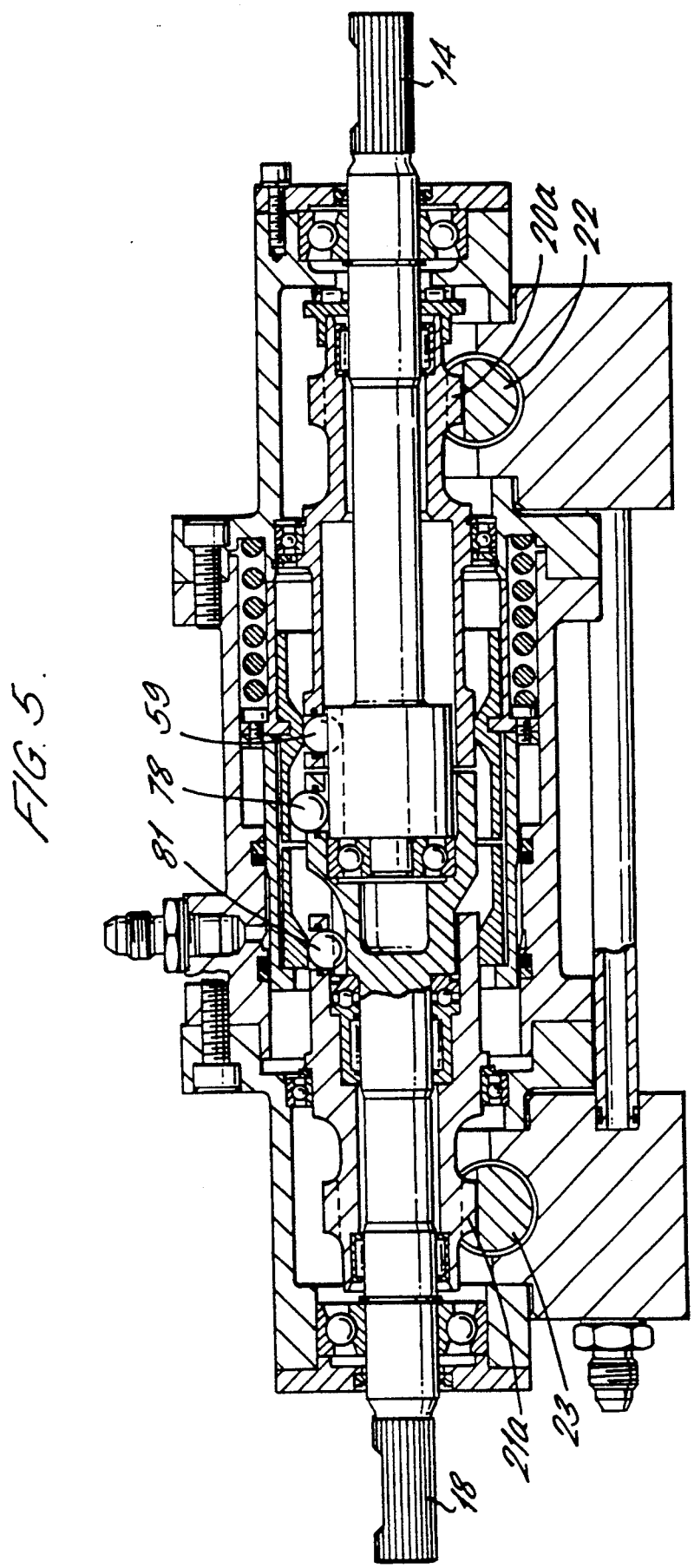
FIG. 5 is a sectional view similar to FIG. 2, with the interlock mechanism in a different position.

One end of the input shaft 14 which is located within the centre housing 55 has a portion of increased diameter 56. In the surface of this portion 56 are a series of recesses 57, of which only two are shown in FIGS. 2 and 5 as grooves cut parallel to the axis of the shaft 14.

One end of the input sleeve 20 surrounds a part of the increased diameter portion 56 of the input shaft 14 and has one or more holes 58 therein. Positioned within the hole 58 is a first locking ball 59 with an "O" ring 60 inserted in a suitable recess in the hole 58 for sealing the ball 59 in the hole 58. FIG. 2 shows only one locking ball, but it will be understood that the description and references to a locking ball and a recess include a plurality of balls and recesses positioned around the sleeve in suitable holes.

Figure 2:
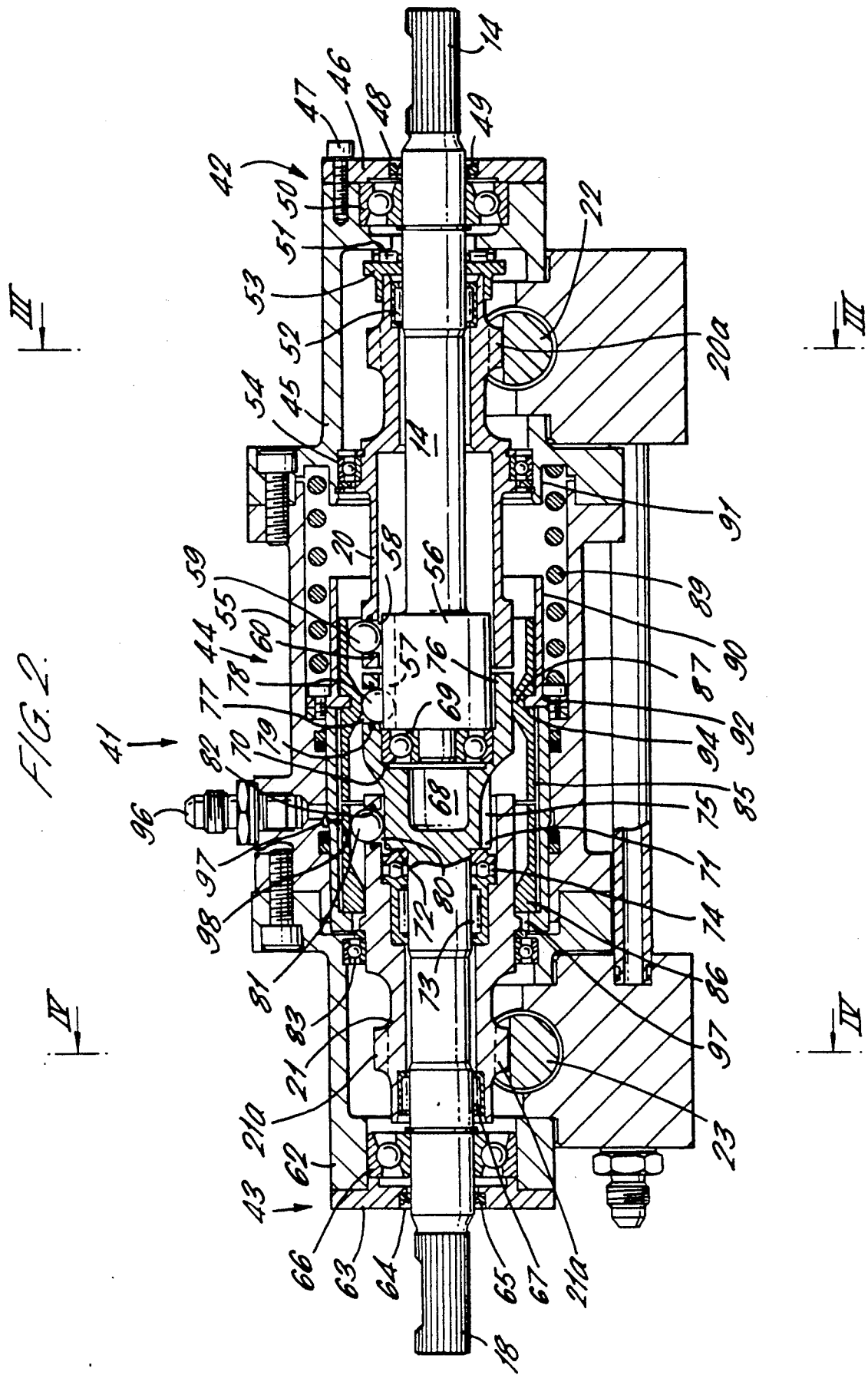
FIG. 2 is a sectional view of one embodiment of a steering column interlock mechanism which is part of the system of FIG. 1.

The ball 59 is movable between a locked position (see FIG. 5) and an unlocked position (see FIG. 2). In the locked position the ball 59 is held so that an upper portion of the ball 59 still lies within the hole 58 and a lower portion lies in the groove 57. It is obviously important that the recess 57 is of a size capable of receiving at least a part of the ball 59 preferably without much slack. When in the locked position the ball 59 causes sleeve 20 to rotate with the input shaft 14 and when in the unlocked position the input shaft 14 is free to rotate relative to the sleeve 20.

The output section 43 comprises an output housing 62 to which is affixed by suitable means an end cap 63. The output housing 62 is also attached by suitable means to the centre housing 55. The input, centre and output housings 45, 55, 62 thus form a sealed unit around the mechanism of the mechanical interlock device 41.

The end cap 63 has an axial hole 64 therein through which output shaft 18 is positioned and sealed with a sealing ring 65. The output shaft is supported in the output housing 62 by an angular contact bearing 66 and a needle roller bearing 67. This combination may be varied to other suitable combination.

Mounted within the housing 62 on output shaft 18 is the output gear sleeve 2 in engagement with the teeth of output rack 23. The needle roller bearing 67 is positioned between the output shaft 18 and the output sleeve 21 to assist relative rotational movement therebetween when required. The output sleeve 21 is supported within the output housing 62 by a ball bearing 83.

One end of the output shaft 18 extends to within the centre housing 55. This end of the shaft 18 has a hollow bore 68. Within the hollow bore 68 is situated a second angle contact bearing 69 against the locating face 70. This end of the output shaft 18 also has a stepped surface, the diameter of a first portion 71 being less than the diameter of a second portion 76. A needle roller thrust bearing 73 and a radial bearing 74 are located against the step face 72 resulting from the first increase in diameter of portion 71. In the surface of the first increased diameter portion 71 is a series of recesses 75, only one of which is shown in FIGS. 2 and 5 as a groove or slot cut parallel to the axis of the shaft 18.

The end of the output shaft 18 just described may be integrally formed with the shaft 18 itself, as shown, or it may be a collar fixed thereto so as to be rotatable with the shaft 18.

The input and output shafts 14, 18 are located such that a part of the increased diameter portion 56 of the input shaft 14 is positioned to lie within the larger diameter of bore 68 of the output shaft 18.

In the surface of the second portion 76 of increased diameter which overlies the input shaft 14 is a hole 77, located within which is a second locking ball 78 and "O" ring 79 in a similar arrangement as the hole 58 in the input sleeve 20 and the first locking ball 59. Again these references to a single ball include references to a plurality of balls positioned in holes around the diameter of the sleeve.

The second locking ball 78 is also movable between a locked position (see FIG. 2) and an unlocked position (see FIG. 5). In the locked position the ball 78 is held so that an upper portion of the ball 78 still lies in the hole 77 in the output shaft 78 and a lower portion lies in the recess 57 in the input shaft 14. When the second ball 78 is in the locked position the input and output shafts 14, 18 are locked together so that they can only rotate together as a single steering column. When in the unlocked position the ball 78 is clear of the recess 57 and the two shafts 4, 18 are free to rotate relative to each other.

In a similar arrangement the output gear sleeve 21 also has a hole 80 in which is situated a third locking ball 81 and "O" ring 82. In a locked position a lower portion of the third ball 81 is forced into a recess 75 in the output sleeve 21 (see FIG. 5) so that the output sleeve 21 and output shaft 18 can be locked so that they rotate together. In the unlocked position (see FIG. 2) the output shaft 18 is free to rotate relative to the output sleeve 21. The references to a single ball also include references to a plurality of balls located in holes about the diameter of the sleeve.

The locking balls 59, 78, 81 are effectively means for keying components together and could be replaced by other suitable means.

Referring back to FIG. 2 the means for moving the three locking balls 59, 78, 81 between their two positions will now be described.

Situated within the centre housing 55 is an actuation sleeve 85, which surrounds the adjacent end portions of the input and output shafts 14, 18.

The actuation sleeve 85 has two flat-topped internal protrusions or flanges 86, 87. The function of these flanges 86, 87 is to move the locking balls 59, 78, 81 between their unlocked and locked positions. The flanges 86, 87 are spaced apart so that when flange 87 is in contact with the first locking ball 59 forcing it into the locked position, the flange 86 is simultaneously in contact with the third locking ball 81 forcing it into the locked position (see FIG. 5).

The actuation sleeve 85 is movable from the aforementioned position to the left to a second position (shown in FIG. 2) whereby the flanges 86, 87 move out of contact with the first and third balls 59, 81 thus allowing them to return to the unlocked position whilst flange 87 moves into contact with the second ball 72 forcing it into the locked position.

It is envisaged that the sleeve 85 could be adapted to lock/unlock a greater number of keying means, to couple/uncouple a larger number of components than that described.

Movement of the actuation sleeve 85 is effected by hydraulic pressure and a helical compression spring 89. One end of the spring 89 is located in a suitable recess 91 in the input housing 45. The other end of the spring 89 abuts an external shoulder 92 in the outer sleeve 90 so that the spring 89 generally biases the outer sleeve 90 towards the left (towards the output section 43). The outer sleeve 90 also has an internal projection 92 which is positioned in a suitable recess 94 in the actuation sleeve 85 so that if the outer sleeve 90 is moved linearly, it causes the actuation sleeve 85 to move accordingly.

The sleeves 85, 90 may be replaced by a single component where suitable.

There is also provided an inlet connector 96 for a hydraulic supply (not shown) which is connected to the isolating valve 40 and which allows hydraulic fluid to be pumped into a chamber 97 or to allow it to flow out. As fluid is pumped into this chamber 97 hydraulic pressure is applied to a differential area 98 of the outer sleeve 90 which forces the sleeves 85, 90 towards the input section 42 against the bias of the spring 89.

Release of the fluid pressure will allow spring 89 to recover and force the sleeves 85, 90 back towards the output section 43.

Figure 2A:
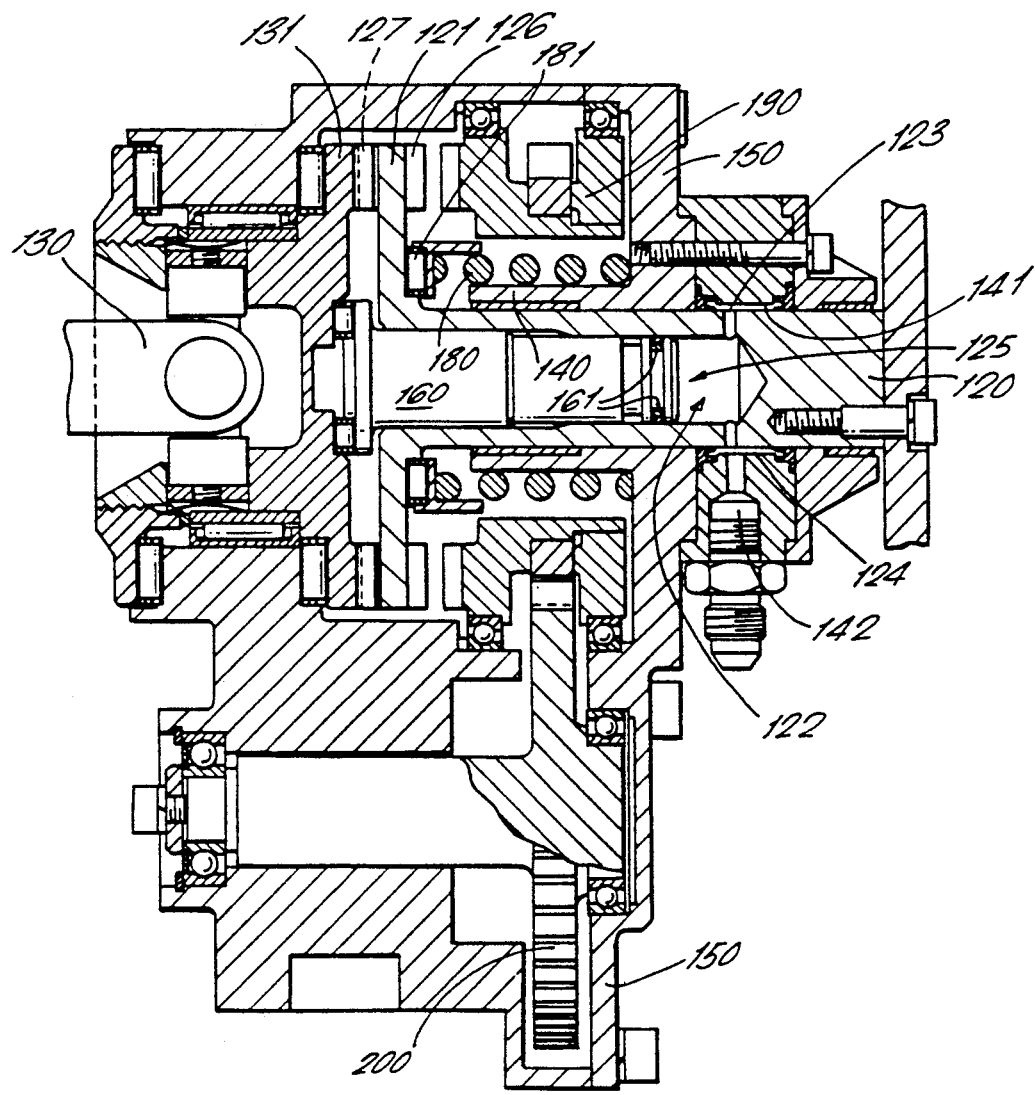
FIG. 2a is a sectional view of a second embodiment of a steering column interlock mechanism which is part of the system of FIG. 1.

An alternative embodiment of the mechanical interlock device 41 can be seen in FIG. 2a. The input shaft 120 of the device is connected to the upper end of the steering column 12. The output shaft 130 is connected to the second part 18 of steering column 12. The input shaft 120 is connected to a toothed member 121. The input shaft 120 contains a cavity 122 of a cylindrical nature. A plurality of tubes, 123 and 124, allow communication between the cylindrical cavity 122 and the exterior of the input shaft 120. The input shaft 120 is slidably positioned in a sleeve 140. Sleeve 140 is formed as part of a housing 150. The housing 150 defines an annular aperture 141 adjacent to the input shaft 120. The annular aperture 141 is defined such that the aperture is in communication with the interior cavity 122 of the input shaft 120, by means of the tubes 123 and 124. The aperture 141 is also connected to the exterior of the housing 150 by a passage 142 which is connected to a pipe carrying hydraulic fluid from the steering control system.

A cylindrical member 160 is disposed in the cylindrical aperture 122 and washers 161 are provided on the cylindrical member 160, so that a section of the aperture 122 is completely sealed. In the figure the sealed section is referred to generally by the numeral 125.

The mechanical interlock also comprises an output shaft 130 connected to the output shaft 18 of the steering column. The output shaft 130 is connected to an annular toothed member 131, and both are freely rotatable within the housing 150.

When hydraulic fluid is forced into the cavity 125, the input shaft 120 is forced away from the output shaft 170, Against the action of a spring 80, the input shaft 120 sliding relative to the housing 150. Communication between cavity 125 and the hydraulic fluid inlet 142 is maintained by virtue of the annular aperture 141. The input shaft 120 is forced back into a position wherein the teeth 126 of the toothed member 121 engage with the teeth of a toothed member 190 adapted to freely rotate within the casing 150.

The toothed member 1290 may be connected by means of gears, such as gear 200, a hydraulic feel actuator, as mentioned before, so that torque may be applied to the upper portion 14 of the steering column. In fact the mechanical interlock of FIG. 2a can be combined with the hydraulic feel actuator of FIG. 6, to form an integral unit. If this is the case then the gear 200 of FIG. 2a corresponds to gear 106 of FIG. 6 and the rack 101 acts directly on the gear to apply torque to the input shaft 120.

If the steering system fails, then hydraulic fluid ceases to be forced into the cavity 125 and the spring 180 acts to force the input shaft 120 towards the output shaft 130, so that the teeth 1127 of the toothed member 121 engage the teeth 131 or the output shaft 130 and the upper portion 14 of the steering column 12 is directly connected to the lower portion 18 of the steering column, allowing the vehicle to be steered manually.

Active Mode

In use the steering system 10 will be in active mode, in which case the input from the steering wheel 11 is mechanically decoupled from the steering box 16 and the steering column comprises two unconnected parts. In this mode the isolating valve 40 is energised by a signal from the microprocessor 30 to open and hydraulic pressure is applied to the sleeve 90 of the interlock mechanism 41 which forces sleeves 85, 90 against the bias of spring 89, as shown in FIG. 5. In this position the first and third locking balls 59 and 81 are forced into grooves 57 and 75 respectively to couple the input and output gear sleeves 20 and 21 with the input and output shafts 14 and 18.

The second locking ball 78 is in the unlocked position, thereby uncoupling the output shaft 18 from the input shaft 14 and allowing them to rotate freely relative to each other.

Alternatively the hydraulic pressure is applied to force the input shaft 120 of the second embodiment shown in FIG. 6 to slide relative to the casing 150 so that the input shaft 120 is decoupled from the output shaft 130.

In this active mode the torque applied to the steering wheel 11 by the driver is sensed by sensor 13 which sends a corresponding signal to the microprocessor 30.

A reaction to the driver's demand is provided by the feel actuator 25. To do this the microprocessor 30 interprets the information supplied by the torque sensor 13 and sends a control signal to the servo-valve 31 of the feel actuator 25 to apply hydraulic pressure to the piston heads 26. This is used to provide resistance to movement of the input rack 22 and therefore the steering wheel 11 and to generally simulate the "feel" of steering. Factors such as inertia, damping, load/displacement, stiffness, backlash, velocity limits and breakout force characteristics are taken into consideration by the microprocessor 30 when sending its control signals to the feel actuator 25 to provide a safe steering system suited to the driver.

Figure 7:
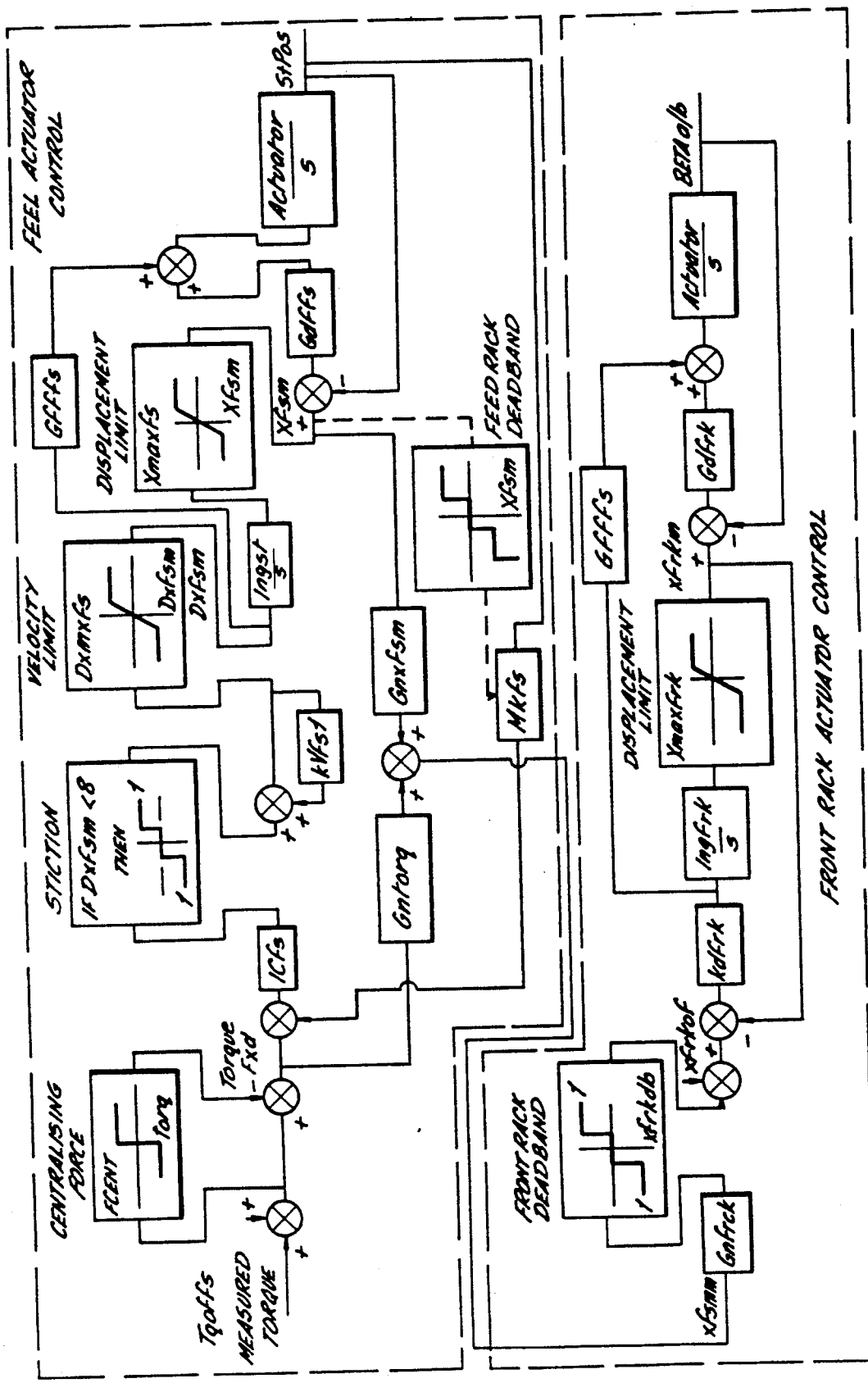
FIG. 7 shows an embodiment of a control system used in the system.

A control diagram according to the invention can be seen in FIG. 7. The control system is split into two sections, one controlling the feel actuator and one controlling the front rack steering system. The transducers required for the system sense the torque applied to the steering wheel and the position of the steering wheel, the front rack position and also vehicle speed. What now follows is a description of parts of the control system.

The measured torque is input into the control system and is offset with a term TQOFFS. This is a software offset on the measured torque. When the system is depressurised and the steering wheel is in the central position, TQOFFS can be varied as required so as to make the measured torque STORQ zero.

The control system then adds a constant to the measured torque, which constant causes the system to apply a constant centralising force when the wheel is away from the central position.

The control system for the feel actuator models damping, by use of the term ICFS. The term may be varied to suit the requirements of the driver, so as to provide the driver with his preferred "steering feel".

The feel actuator control also models "striction". If the steering wheel is stationery then the demanded velocity is set to zero until a minimum level of torque is exceeded.

KVFS1 is an inertial term. The feel actuator control system models the inertia of the system. Increasing the KVfs1 term increases the inertia of the feel actuator control system. The term can be varied so as to provide the driver with his preferred "steering feel".

The actuator control system can also be used to artificially limit the maximum velocity of the system, to an arbitrary value Dxmxfs.

A feedback loop in the system, uses a stiffness term Mkfs. The value MKFS is the sum of the velocity component of stiffness and the product of the velocity of the vehicle and a term MKFSV, chosen to give a desired characteristic of increasing stiffness with speed. The Mkfs term can be set to zero by the software if a simulated deadband is introduced. The deadband can be introduced by a feel rack deadband function, which sets the MKFS term to zero for a predetermined range of steering wheel motion.

The feel actuator control can also be used to artificially limit the maximum angular velocity of the upper portion of the steering column. The actuator control can also limit the maximum displacement of the steering wheel from a central position. The limits on velocity and placement can be chosen by the driver, to best suit his mode of driving.

The measured torque, compensated for the system offset and also modified by the chosen centralising force, is multiplied by a term GNTORQ which is a parameter defining the desired ratio of front rack displacement to feel rack torque. The model feel rack displacement XFSM is multiplied by a term GNXFSM, which is a parameter chosen to be the front rack displacement/fuel rack displacement ratio. The two products are summed and then input into the front rack actuator control.

The front rack actuator control contains a function defining a front rack dead band. If the demanded rack position is less than a chosen constant XFRKDB, then the demanded rack position is set to zero. The front rack actuator control also places chosen limits on the displacement of the front rack. A term may be added to compensate for front rack offset, this being designated in the diagram as XFRKOF.

The front rack actuator control also integrates an incremental displacement to give a required displacement and compares the required displacement with the front rack position βA/B, this being measured by a duplex sensor.

It can be seen from the diagram that there are many variables which can be altered, to provide a "feel" to the steering, that is best suited to the driving characteristics of the driver. It is envisaged that the driver himself could vary to some degree the feel of the steering of his car, to find a set up that suits his driving characteristics.

Use of the hydraulic actuators also provides the opportunity for inclusion of a selectively variable reduction system, removal of shocks (or addition where required) transmitted from the road wheels to the drivers hands and the "feel" reaction may be programmed according to the requirements of each driver and each vehicle.

Simultaneously control signals are sent by the microprocessor 30 to the servo-valve 31 of the steer actuator 24 to move the output rack 23 by the application of hydraulic fluid pressure to the two piston heads 26 which causes the output gear sleeve 21 to rotate which in turn drives the output shaft 8 to effect the required steering action. This in effect is steering by remove control. The LDVT 29 of the steer actuator 24 detects the actuator position of the output rack 23 and sends this information to the microprocessor 30 which uses it as position control. A further LDVT may be attached to the steering linkage to check that the actual steering is being effected correctly. The microprocessor 30 is thus able to control the movement of the output rack 23 according to measurements taken from the sensor 13 on the steering column. Thus steering may be effected with a simulated gear ratio (negative or positive) proportional to the load on the steering wheel or related to any parameter measured in the feel system.

The Non-Active Steer System

In the event of a system failure of when the active mode is switched off the steering system 10 reverts to a conventional mechanical system with a single steering column. This will automatically occur in the event of a failure resulting in loss of control such as loss of electrical supplies or a drop in the hydraulic supply pressure below a predetermined safety limit. A typical example of such a failure would be if the supply pressure to the steer or feel actuators 24, 25 or their associated control systems dropped to below 1500 psi which is the pressure at which the steer and feel actuators 24, 25 los their authority. Obviously this valve will vary according to the actual actuators used.

Duplex sensors are used in the primary areas such as the steering torque sensor 13, the signals being combined to give a demand and a failure detection signal.

Limits are set on the permitted deviation of the error signal and deviation outside these limits constituting a failure will cause the solenoid isolating valve 40 to be de-energised. Such failures in the actuators 24, 25 and their control loops are detected by comparing the actual performance of the actuators 24, 25 and control loops with a real-time model running in parallel and a threshold error detection level programmed in the microprocessor 30.

For selective override the driver will be provided with a system isolation switch which directly de-activates the system by de-energising the isolating valve 40.

If the first embodiment of the interlock device shown in FIG. 2 is used by the system and the isolating solenoid valve 40 is de-energised then the valve 40 disconnects the chamber 97 of the mechanical interlock device from the hydraulic pressure line 39 and connects the chamber 97 with the hydraulic return line 37. If the failure is due to drop in system pressure the isolating valve 40 may remain energised but the drop in pressure will have the same effect as if the interlock device 41 were now connected to the return line 37. The spring 89 recovers forcing the actuation and outer sleeves 85, 90 to the left resulting in the first and third locking balls 59, 81 disengaging from the recesses 57, 75 in the input and output shafts 14, 18, and forcing the second locking ball 78 into the recess 57 in the input shaft 14. Thus the input and output shafts 4, 18 are coupled together to act as a single steering column. The steering wheel 11 is thus connected directly to the steering box 16 as shown in FIG. 2 and the gear sleeves 20, 21 are disconnected from the input and output shafts 14, 18 allowing them to rotate independently of the input and output racks 22, 23.

In the event of manual switching, if the driver wishes to re-activate the active steering mode switching will cause the isolating valve 40 to energise and re-connect with the hydraulic pressure line 38 so that the hydraulic pressure applied to the actuation sleeve 85 forces it against the bias to compress spring 89 and lock the first and third locking balls 59, 81 into the recess 57, 75 whilst releasing the second ball 78. The two shafts 14, 18 will then again be free to rotate relative to each other and the gear sleeves 20, 21 locked again so that they rotate with the input and output shafts 14, 18.

Alternatively, if the system uses the second embodiment of the interlock device, shown in FIG. 6, then de-energisation of the solenoid valve 40 or a drop in system pressure will allow the spring 180 to move the inlet shaft 120 to the housing 150, so that the teeth 127 of the tooth member 121 attached to the input shaft engage with the teeth 131 of the output shaft 130. In this way, the upper portion of the steering column is connected to the lower portion of the steering column and manual steering is facilitated.

If the computer has been responsible for activating the mechanical interlock system as a result of a failure it will not allow re-activation of the active mode until the computer has been interrogated to find out why the interlock was activated.

Although the system 10 described operates in response to the torque detected at the steering wheel, this system may be adapted to operation in response to other factors such as position or movement of the wheel 11, or a combination of some or all of these factors.

We claim:

1. A vehicle steering system comprising:
   a manually operable steering element;
   control signal generating means responsive to operation of the steering element for generating control signals;
   means for steering at least one vehicle wheel in response to the control signals generated by the control signal generating means; and
   selectively operable coupling means to enable the vehicle wheel to be mechanically coupled to the steering element for manual steering of said vehicle wheel independently of said control signals, the coupling means comprising first and second engageable elements, engagement means comprising spring means for biasing the first and second engageable elements into an engaged condition and disengagement means comprising hydraulic means for applying fluid pressure on the first and second engageable elements to disengage the first and second engageable elements, wherein the steering element is decoupled from the vehicle wheel when the first and second engageable elements are disengaged by the disengagement means and the steering element is coupled to the vehicle wheel when the first and second engageable elements are engaged by the engagement means.

2. A system as claimed in claim 1, in which the coupling means are selectively operable by means of a manually operable switch.

3. A system as claimed in claim 1, in which the coupling means comprises a piston moveable in a cylinder between a first position in which the steering means are mechanically coupled to the steering element, and a second position in which said steering means and steering elements are uncoupled.

4. A system as claimed in claim 3, in which the steering element is mounted on a first steering column part and the steering means coupled to a second steering column part.

5. A system as claimed in claim 4, in which the engagement means includes keying means comprising a plurality of balls moveable by the piston into and out of locking engagement with the steering column parts so that the steering column parts may be coupled or uncoupled.

6. A system as claimed in claim 1, in which the steering element is a steering wheel.

7. A vehicle steering system as claimed in claim 1 wherein the coupling means further comprises means operable to decouple the vehicle wheel from the means for steering the wheel in response to the control signals generated by the control signal generating means.

8. A vehicle steering system as claimed in claim 7 wherein the coupling means is operable to simultaneously couple the steering wheel to the vehicle wheel and decouple the vehicle wheel from the means for steering the vehicle wheel in response to control signals generated by the control signal generating means.

9. A vehicle steering system as claimed in claim 8 further comprising actuator means connected to the steering element for providing a resistive force on the steering element, wherein the coupling means further comprises means for decoupling the steering element from the actuator means.

10. A vehicle steering system as claimed in claim 9 wherein the coupling means is operable to simultaneously couple the steering element to the vehicle wheel and uncouple the actuator means from the steering element.

11. A vehicle steering system as claimed in claim 10 wherein the actuator means is responsive to control signals generated by the control signal generating means.

12. A vehicle steering system comprising:
    a manually operable steering element;
    control signal generating means responsive to operation of the steering element for generating a control signal;
    a vehicle wheel;
    steering means for steering the vehicle wheel in response to the control signal generated by the control signal generating means;
    actuator means for applying a resistive force on the steering element; and
    coupling means having two operating conditions;
    a first operating condition in which the coupling means couples the steering means to the vehicle wheel, couples the actuator means to the steering element and uncouples the steering element from the vehicle wheel, and
    a second operating condition in which the coupling means uncouples the steering means from the vehicle wheel, uncouples the actuator means from the steering element and couples the steering element to the vehicle wheel.

13. A vehicle steering system as claimed in claim 12 wherein:
    the steering element is a steering wheel,
    a shaft is connected to and rotated by the steering wheel,
    the coupling means comprises a sleeve located around the shaft and rotatable relative to the shaft, the sleeve being connected to the actuator means, and interlocking means for locking the sleeve to the shaft, and wherein relative axial movement is permitted between the shaft and the sleeve, the sleeve and the shaft having a first position relative to each other in which the interlocking means locks the sleeve to the shaft and the sleeve and the shaft having a second position relative to each other in which the shaft is free to rotate relative to the sleeve.

14. A vehicle steering system as claimed in claim 13 wherein spring means is provided to act on the sleeve to bias the sleeve into the first position relative to the shaft.

15. A vehicle steering system comprising:
a manually operable steering element;
control signal generating means responsive to operation of the steering element for generating control signals;
means for steering at least one vehicle wheel in response to control signals generated by the generating means; and
selectively operable coupling means to enable the vehicle wheel to be mechanically coupled to the steering element for manual steering of said vehicle wheel independently of said control signal, wherein the coupling means is operable by fluid pressure, the application of fluid pressure to the coupling means biasing the coupling means to mechanically uncouple the vehicle wheel from the steering element, the coupling means comprising a piston moveable in a cylinder between a first position in which the vehicle wheel is mechanically coupled to the steering element, and a second position in which said vehicle wheel and steering elements are uncoupled.

16. A system as claimed in claim 15, in which the steering element is mounted on a first steering column part and the vehicle wheel is coupled to a second steering column part.

17. A system as claimed in claim 16, in which the coupling means includes keying means comprising a plurality of balls moveable by the piston into and out of locking engagement with the steering column parts so that the steering column parts may be coupled or uncoupled.

* * * * *

UNITED STATES PATENT AND TRADEMARK OFFICE
CERTIFICATE OF CORRECTION

PATENT NO. : 5,273,129
DATED : December 28, 1993
INVENTOR(S) : Wright et al.

It is certified that error appears in the above-indentified patent and that said Letters Patent is hereby corrected as shown below:

Column 14, line 1, cancel "signal" and
            insert --signals--.

Signed and Sealed this

Thirty-first Day of May, 1994

Attest:

BRUCE LEHMAN

*Attesting Officer*  *Commissioner of Patents and Trademarks*